United States Patent [19]

Hinrichs et al.

[11] Patent Number: 4,995,342

[45] Date of Patent: Feb. 26, 1991

[54] HOLDER FOR BIRD FOOD PACKED IN PORTION CONTAINERS

[75] Inventors: Michael Hinrichs, Kirchlinteln-Luttum; Jurgen Homolla, Minden; Eckart Schormair, Otersen; Klaus Czempik, Verden; Rolf Hornig, Kirchlinteln-Luttum, all of Fed. Rep. of Germany

[73] Assignee: EFFEM GmbH, Verden, Fed. Rep. of Germany

[21] Appl. No.: 499,088

[22] Filed: Mar. 26, 1990

[30] Foreign Application Priority Data

Apr. 1, 1989 [DE] Fed. Rep. of Germany ... 8903972[U]
Sep. 14, 1989 [DE] Fed. Rep. of Germany ... 8911093[U]

[51] Int. Cl.$^5$ .............................................. A01K 5/01
[52] U.S. Cl. ........................................ 119/18; 119/61
[58] Field of Search ................ 119/18, 57.8, 58, 61, 119/60; 248/222.1, 222.2, 221.3, 231.1, 231.8, 231.9, 311.2, 318

[56] References Cited

U.S. PATENT DOCUMENTS

| | | | |
|---|---|---|---|
| 340,116 | 4/1886 | Huiman | 119/18 |
| 1,537,615 | 5/1925 | McConnell | 119/18 |
| 2,309,830 | 2/1943 | Dearle | 119/18 |
| 2,531,915 | 11/1950 | Maly | 119/18 |
| 3,361,116 | 1/1968 | Daniel et al. | 119/18 |
| 4,261,294 | 4/1981 | Bescherer | 119/57.8 |
| 4,432,304 | 2/1984 | Johnson | 119/18 |
| 4,574,738 | 3/1986 | Tominaga | 119/18 |

Primary Examiner—John Weiss
Attorney, Agent, or Firm—Curtis, Morris & Safford

[57] ABSTRACT

A holder for bird food packed in portion containers with a reception portion extending horizontally when in use and having an opening forming a receptacle for the portion container. The reception portion is provided with a gripping portion connected thereto, a first notch located between the reception portion and the gripping portion and extending at right angles to the extension thereof and an end flange fixed to the plate at right angles adjacent to the notch. At its end remote from the plate the holder is provided with a second notch oriented vertically with respect to the first notch when in use. Alternatively, the reception portion is provided with a flange fixed in downwardly projecting manner and at right angles to the reception portion, a flexible locking plate fixed to the flange and extending away from the reception portion in the longitudinal direction. The locking plate slopes upwards over and beyond the upper edge of the reception portion and close to its highest point has a first, transversely directed notch and a web fixed at right angles to the flange and extending away from the reception portion in the longitudinal direction. The locking plate is also provided, on its lower edge, with second notches oriented vertically with the first notch during use.

19 Claims, 6 Drawing Sheets

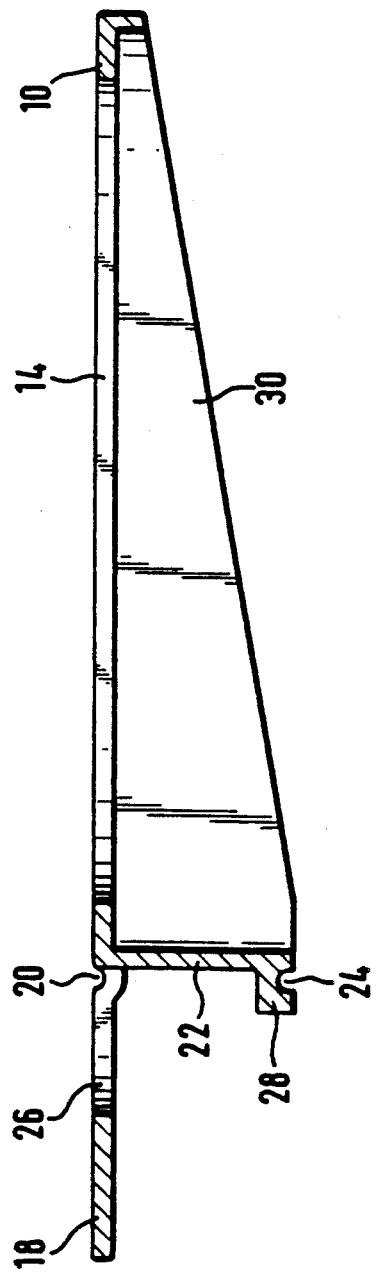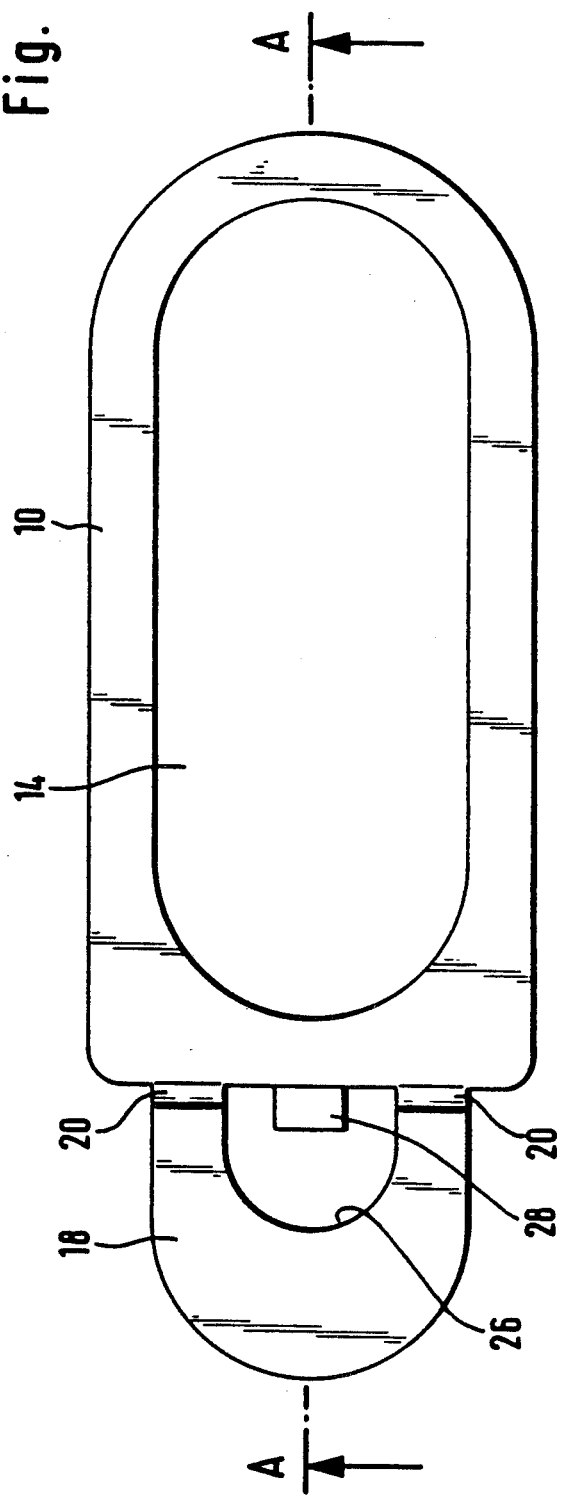

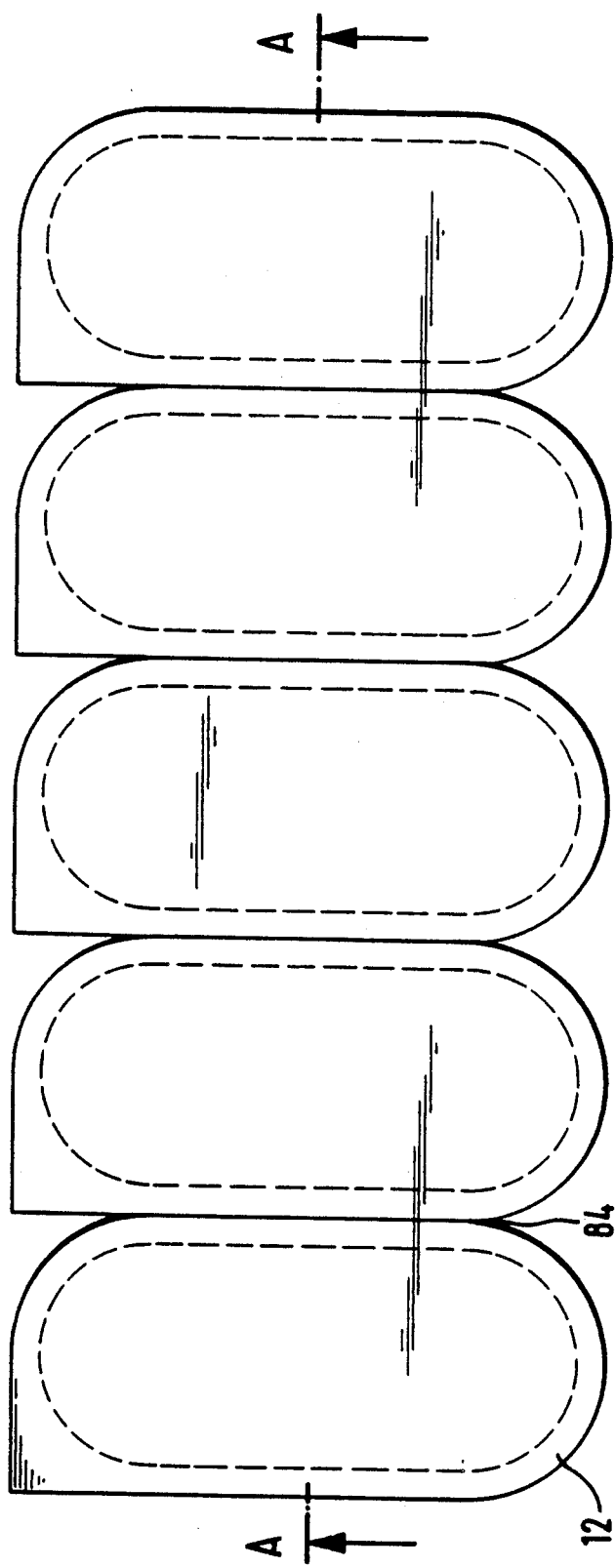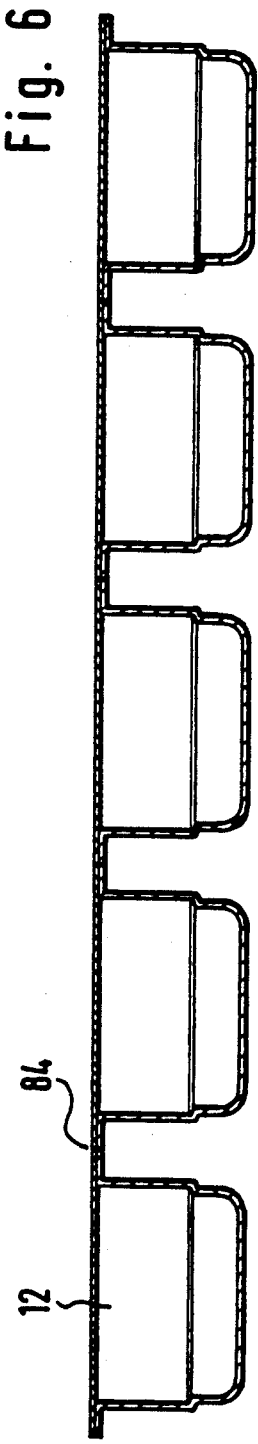

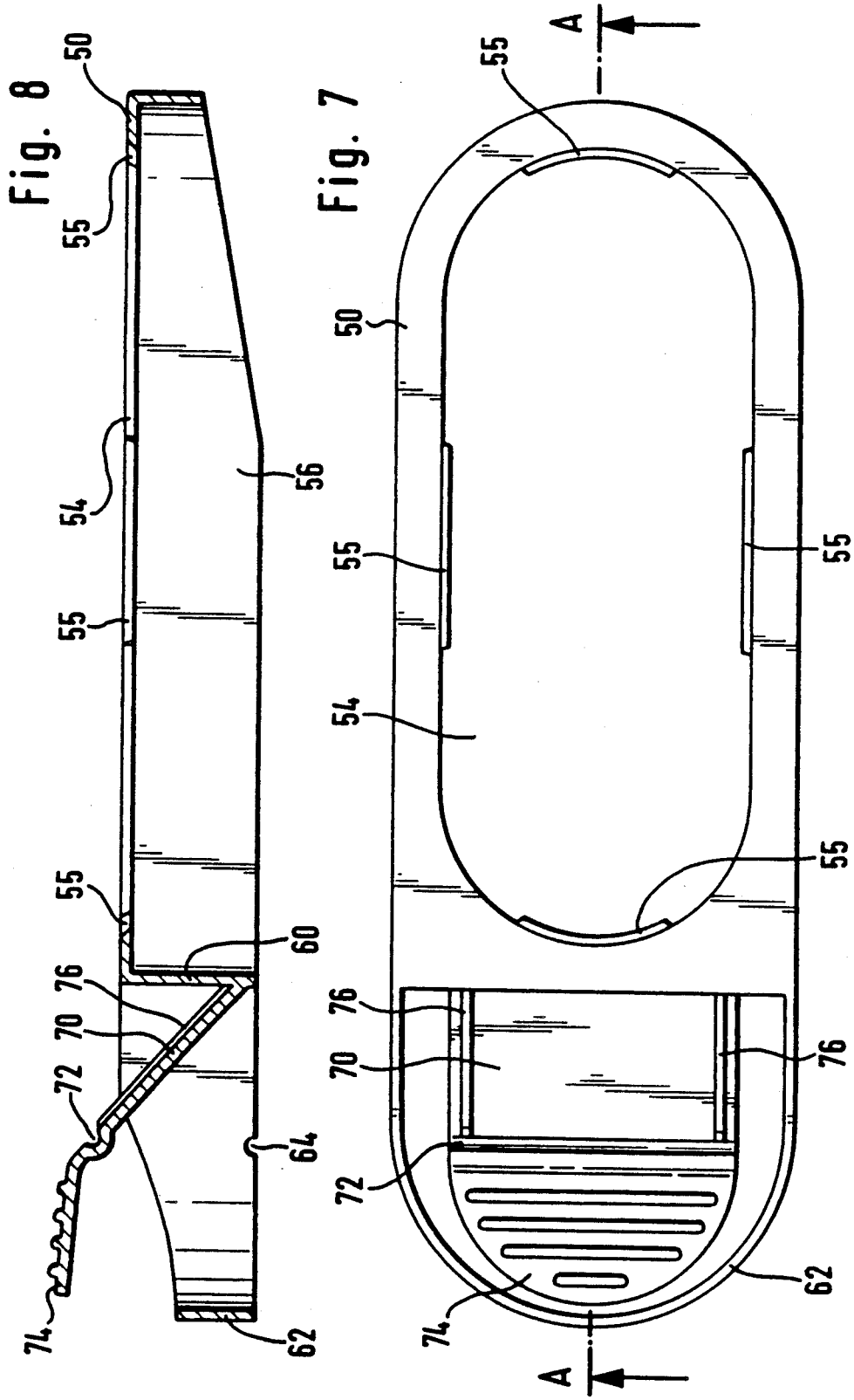

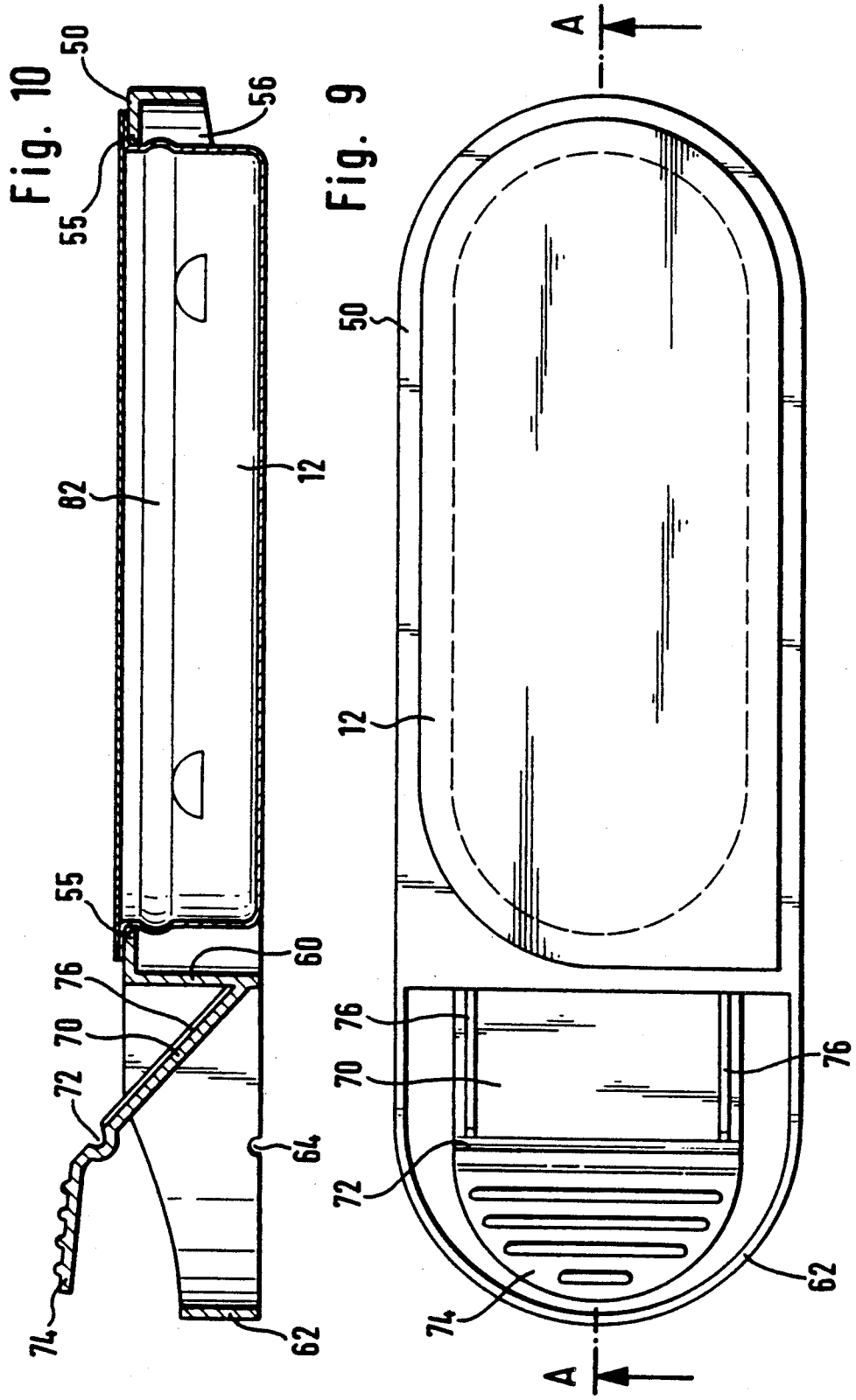

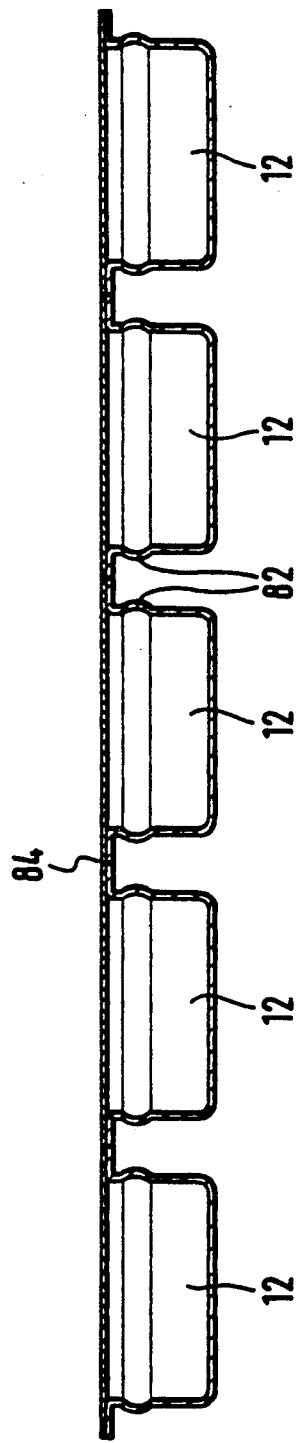

4,995,342

HOLDER FOR BIRD FOOD PACKED IN PORTION CONTAINERS

FIELD OF THE INVENTION

The present invention relates to a holder for bird food packed in small portion containers.

BACKGROUND OF THE INVENTION

Portions of bird food are regularly poured from a storage pack into a small container, cup or receptacle and placed in the bird cage. The receptacle is refilled when appropriate. For hygienic reasons it is necessary to regularly clean the container, but this task is often neglected.

OBJECT OF THE INVENTION

The object of the present invention is to provide a means to ensure the supply of bird food in a hygienic manner.

SUMMARY OF THE INVENTION

According to the invention this problem is solved by providing a reception portion extending horizontally in use with an opening forming a receptacle for receiving a food retaining container. A gripping portion connected to the reception portion has a first notch located between the reception portion and the gripping portion and running at right angles to the extension thereof. An end flange is also provided fixed at right angles to a plate adjacent to the notch and is provided at its plate-remote end with a second notch oriented vertically with the first notch during use. Preferably the opening in the reception portion is oval.

According to a preferred embodiment the gripping or handle portion is shaped like an oval bisected along its secondary axis.

It is also proposed that the gripping portion be provided with a gripping or handle recess open towards the end or front flange with that recess being shaped like an oval bisected along its secondary axis.

In a preferred embodiment the end flange is provided with a nose forming the second notch and by a flange passing round the reception portion with the flange inclined with a height increasing towards the end flange.

In an alternative embodiment of the invention the reception portion extends horizontally in use with an opening forming a receptacle for the food portion container and a downwardly projecting flange fixed at right angles to the reception portion. A flexible locking plate fixed to the flange and extending away from the latter in the longitudinal direction of the reception portion is provided and slopes upwards over and beyond the upper edge of the reception portion and has on or near to its highest point a first, transversely directed notch. Also provided is a web fixed at right angles to the flange and extending in the longitudinal direction of the reception portion away from the latter. The web is provided at its lower edge with second notches oriented vertically with the first notch in use.

The inventive arrangement of at least one notch on a flexible locking plate necessary for the mounting support between the cross struts of a bird cage ensures, as a result of the holder-side resiliency of this element, a reliable firm seating of the holder between the cross struts of a bird cage and makes it possible to use the holder according to the invention even in the case of a different spacing between the same.

Preferably the web is constructed in the form of an oval bisected along its secondary axis and which extends over and beyond the locking plate end remote from the reception portion, which is fixed with both ends at right angles to the flange and has two correspondingly oriented second notches. This construction ensures a particularly simple and reliable handling of the inventive holder.

The invention also provides a locking plate with a gripping portion following onto the first notch and which is preferably semicircular, the base side of said semicircle engaging on the first notch and is grooved on its top surface. The unitary construction of the web, in the form of a bisected oval, and the locking plate with a correspondingly constructed gripping portion, makes it particularly simple and reliable to handle the holder according to the invention. The underside of the web is preferably held by one or two fingers of the hand, while the thumb exerts pressure on the gripping portion, so as to press the locking plate down prior to insertion and thereby pretensioning the same, so that the latter with a corresponding resiliency locks with its first notch in the upper cross strut of the bird cage.

In a preferred embodiment the locking plate is provided with reinforcing webs on its top and/or bottom. This effectively precludes an easy dislodging of the locking plate.

According to another embodiment of the invention, in the vicinity of the gripping portion, the web is constructed with a decreasing height in the direction away from the reception portion. This ensures that the gripping portion of the locking plate may be pressed down far enough so as not to be impeded by the web.

According to the invention a flange passing round the reception portion is provided and, preferably, at its end remote from the locking plate, is bevelled with a decreasing height in the direction away from the latter. This flange stabilizes the holder and its bevel at the end remote from the locking plate and facilitates the insertion of the holder between the cross struts of the bird cage.

Finally, for all embodiments of the invention the opening to receive the food portion containers is provided with inwardly directed projections, at least in portions thereof. In a complementary construction thereto the portion containers, insertable in the holder, are provided with a corresponding step, so that after overcoming a pressure point on inserting the portion container a firm locking thereof in the opening of the reception portion is obtained. This ensures the firm seating of the containers particularly when the bird is removing food.

BRIEF DESCRIPTION OF THE DRAWINGS

The invention is described in greater detail hereinafter relative to non-limitative embodiments and the attached drawings, wherein:

FIG. 1 is a plan view of an embodiment of the invention holder;

FIG. 2 is a sectional view along line A—A of FIG. 1;

FIG. 5 is a plan view of a row of interconnected portion containers;

FIG. 6 is a sectional view along line A—A of FIG. 5;

FIG. 7 is a plan view of an alternative embodiment of the inventive holder;

FIG. 8 is a sectional view along line A—A of FIG. 7;

FIG. 9 is a view corresponding to FIG. 7 with a portion container inserted;

FIG. 10 is a view corresponding to FIG. 8 with a portion container inserted; and FIG. 11 is a sectional view along line A—A of FIG. 5, showing an alternative embodiment of the portion containers.

DETAILED DESCRIPTION OF PREFERRED EMBODIMENTS

Figure 4:
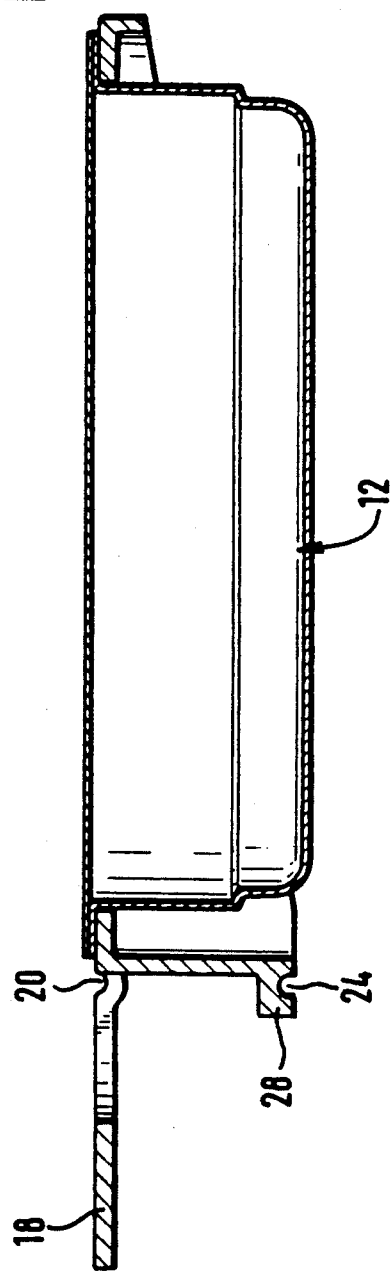
FIG. 4 is a view corresponding to FIG. 2 with portion containers inserted in the holder.
Figure 3:
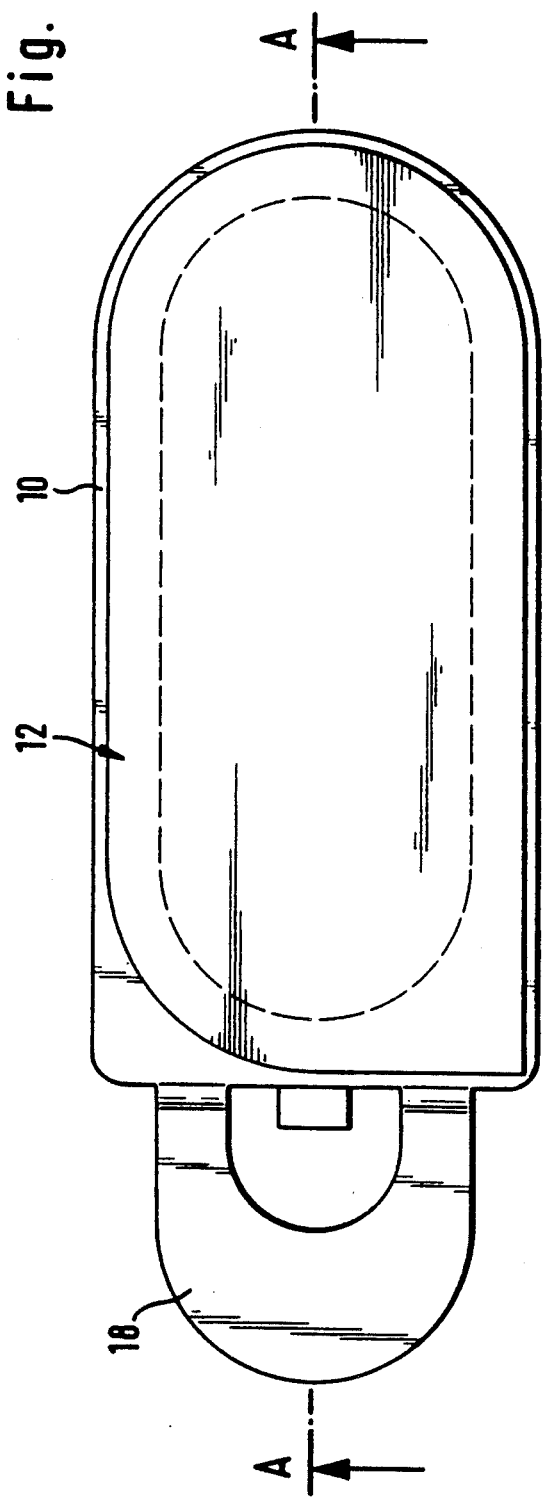
FIG. 3 is a view corresponding to FIG. 1 with portion containers inserted in the holder.

According to a first embodiment of the proposed holder for bird food packed in small portion containers, a reception portion 10 is provided extending horizontally in use and to which is connected a gripping portion 18. The reception portion 10 has an opening 14 for receiving the portion container 12 (FIGS. 3 and 4). An upwardly open, first notch 20 is provided between the reception portion 10 and the gripping portion 18 at right angles to the extension thereof. On the edge of notch 20, directed towards the reception portion 10, is provided an end or front flange 22 extending at right angles thereto. A second notch 24 oriented vertically with the first notch 20 during use is provided on the end of flange 22 remote from the reception portion 10.

The opening 14 in reception portion 10 has an oval construction and corresponds to the external shape of the cup of the portion container 12 shown in FIGS. 5 and 6. The edge surrounding the opening 14 serves as a support for the outwardly projecting flange of the portion container 12.

A gripping portion 18 is shaped like an oval bisected along its secondary axis and is provided with a gripping recess 26 open towards the end flange 22, which is also shaped like an oval bisected along its secondary axis.

FIGS. 2 and 4 particularly show that the end flange 22 is provided with a nose 28 forming a second notch 24. As shown in FIG. 2 the reception portion has an all-round flange 30 having a sloping construction with an increasing height towards the end flange 22.

On first using the holder, the bird owner will break off a food portion container 12 from a strand (FIG. 5) of food portion containers. He will then insert the holder between two horizontally directed struts of the bird cage until the two transversely directed struts lock in the two notches 20 and 24. The sloping construction of the all-round flange 30 facilitates the necessary slight widening of the struts of the bird cage. Then (optionally also prior to inserting the holder), the portion container is inserted in opening 14 and a foil covering over the food in the container is removed.

When the bird has emptied the portion container, a further portion container is broken off from the strand (FIG. 5) and, after removing the empty portion container from the holder, is inserted in the latter. It is possible to release the holder from its fastening struts, but this is not normally necessary, because the bird owner can reach into the cage.

The alternative embodiment of the holder of the present invention shown in FIG. 7 comprises a reception portion 50 extending horizontally in use and having an oval opening 54. Portions of the opening 54 ar provided with inwardly directed projections 55, whose function will be described hereinafter. A flange 60 is fixed at right angles and in downwardly projecting manner to one end of the reception portion 50. A flexible locking plate 70 is fixed to its lower end and, in the longitudinal direction of the reception portion, extends away from the same sloping upwards over and beyond the upper edge of the reception portion 50. Just below its highest point the locking plate 70 is provided with a first transversely directed notch 72 and with a gripping portion 74, which is substantially semicircular with a grooved top. The gripping portion 74, in the represented embodiment, forms an obtuse angle with the remainder of the locking plate 70, so that it is directed substantially horizontally.

A web 62 in the form of a bisected oval is also fixed to flange 60 and extends longitudinally away from the reception portion 50. Web 62 initially has the same height as flange 60, but its height is then decreased and it extends over and beyond the end of the gripping portion 74 of the locking plate 70. In use, the web 62 has notches 64 on its lower edge oriented vertically with the first notch 72.

On inserting this embodiment of the holder of the present invention between the cross struts of a bird cage, the gripping portion 74 of locking plate 70 and web 62 are gripped, the lower edge of the web 62 preferably resting on the index finger of the user and the gripping portion 74 is actuated by the thumb. After the reception portion 50 has been placed between the cross struts of the bird cage, this operation being facilitated by the front portion of the flange 56 passing round the reception portion 50 being bevelled, the gripping portion 74 and, therefore, the complete locking plate 70 with the transversely directed notch 72 is pressed downwards until the notches 64 on the lower edge of web 62 have engaged in the cross strut. When the holder of this embodiment is in the horizontal position, the notch 72 in the locking plate 70, in the case of a slow release of the gripping portion 74, engages in the corresponding, upper cross strut. As a result of the resiliency of the pretensioned locking plate 70, the holder according to the invention is held firmly and securely between the bird cage cross struts.

Prior to inserting the holder according to the invention between the cross struts of a bird cage, as described hereinbefore, the bird owner will first break a portion container 12 off a corresponding supply strand (FIG. 5) at the breaking edge 84 provided for this purpose. He will then insert the portion container 12 in the opening 54 of the reception portion 50. The step 82 below the upper edge of container 12 comes to rest on the inwardly directed projections 55 of the opening 54. After overcoming an initial pressure point, the portion container 12 is firmly fixed in the opening 54 of the reception portion 50. This also ensures that the portion container 12 cannot be dislodged from the holder by the bird. The projection 55 can also obviously be provided in the opening 14 of the first embodiment.

FIGS. 9 and 10 show the holder of the present invention with a correspondingly inserted portion container 12 where step 82 is readily seen. As has also been stated hereinbefore, the foil covering the portion container is then removed and the holder with the inserted and opened portion container is inserted between the cross struts of the bird cage.

When the bird has emptied the portion container 12, in order to simplify handling, the complete holder can be unlocked again by simply pressing down the gripping portion 74 of the locking plate 70 and ca be drawn out between the cross struts of the bird cage. After removing the empty portion container 12 a new one can be inserted, after which the holder is reinserted in the same manner. It is obviously possible, as stated hereinbefore, to replace the portion containers without releasing the holder from the bird cage cross struts.

The holder of the present invention makes it possible to supply the bird with food in a hygienic manner. As the empty container is replaced, there is no risk of prolonged contamination with the danger of bacterial infection.

The inventive features disclosed in the description, drawings and claims can be essential to the realization of the invention in its various embodiments, both alone and in random combination.

What is claimed is:

1. A holder for bird food packed in portion containers comprising a reception portion extending horizontally when in use and having an opening forming a receptacle for a bird food portion container, a gripping portion connected thereto and a first notch between said reception portion and said gripping portion extending at right angles thereto, an end flange fixed at right angles to said reception portion adjacent said notch provided at its end remote from said reception portion with a second notch oriented vertically with respect to said first notch during use.

2. A holder according to claim 1 wherein said opening in said reception portion is oval.

3. A holder according to claim 1 wherein said gripping portion is shaped like an oval bisected along its secondary axis.

4. A holder according to claim 3 wherein said gripping portion is provided with a gripping recess open towards said end flange.

5. A holder according to claim 4 wherein said gripping recess is shaped like an oval bisected along its secondary axis.

6. A holder according to claim 1 wherein said end flange is provided with a nose forming said second notch.

7. A holder according to claim 1 including a flange provided around said reception portion.

8. A holder according to claim 7 wherein said flange slopes with an increasing height in the direction of said end flange.

9. A holder for bird food packed in portion containers comprising a reception portion extending horizontally in use with an opening forming a receptacle for a bird food portion container, a downwardly projecting flange fixed at right angles to said reception portion, a flexible locking plate fixed to said flange and extending away from the latter in the longitudinal direction of said reception portion, said locking plate disposed to slope upwardly over and beyond the upper edge of said reception portion, said locking plate having on or near to its highest point a first, transversely directed notch as well as a web fixed at right angles to said flange and extending in the longitudinal direction of said reception portion away from the latter and being provided at its lower edge with second notches oriented in use vertically with said first notch.

10. A holder according to claim 9, wherein said opening in said reception portion is oval.

11. A holder according to claim 9 wherein said web is constructed in the form of an oval bisected along its secondary axis and extends over and beyond the end of said locking plate remote from said reception portion and is fixed by both ends to said flange.

12. A holder according to claim 9 wherein said locking plate is provided with a gripping portion following onto said first notch.

13. A holder according to claim 12 wherein said gripping portion is semicircular, the base side of said semicircle engaging on said first notch.

14. A holder according to claim 12 wherein the top of said gripping portion is grooved.

15. A holder according to claim 9 wherein the top and/or bottom of said locking plate is provided with reinforcing webs.

16. A holder according to claim 9 wherein said web in the vicinity of said gripping portion is constructed with a height decreasing away from said reception portion.

17. A holder according to claim 9 wherein a flange is provided passing around said reception portion.

18. A holder according to claim 17 wherein said flange is bevelled at its end remote from said locking plate with a height decreasing away from said locking plate.

19. A holder according to claim 9 wherein at least portions of said opening is provided with inwardly directed projections.

* * * * *